March 8, 1960 A. W. VANCE 2,927,734

COMPUTING SYSTEM FOR ELECTRONIC RESOLVER

Filed Dec. 30, 1954

INVENTOR.
ARTHUR W. VANCE
BY Morris A. Rabkin
ATTORNEY

United States Patent Office 2,927,734 Patented Mar. 8, 1960

2,927,734

COMPUTING SYSTEM FOR ELECTRONIC RESOLVER

Arthur W. Vance, Cranbury, N.J., assignor to Radio Corporation of America, a corporation of Delaware Application December 30, 1954, Serial No. 478,741

6 Claims. (Cl. 235—189)

Figure 1:
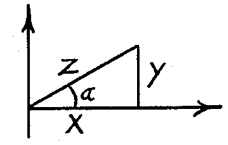

This invention relates to computing apparatus for deriving mathematical functions.

An application of this invention is the derivation of signals representative of trigonometric functions of a variable. Computing apparatus that may be used for this purpose is described in the book, "Electronic Analog Computers" by Korn and Korn, McGraw-Hill, 1952, pages 279 to 287.

It is among the objects of this invention to provide:

A new and improved computing system for deriving mathematical functions;

New and improved computing apparatus for deriving mathematical functions that is accurate and reliable;

New and improved computing apparatus for deriving trigonometric functions that operates rapidly and accurately.

In accordance with this invention a first means produces a signal proportional to the quotient of a first input signal and a derived signal. A second means produces a signal proportional to the quotient of a second input signal and the derived signal. Additional means produces signals proportional, respectively, to the products of each of the input signals and the associated quotient signals and adds the product signals to produce a sum signal. The sum signal is fed back to the first and second means as the derived signal. Where the input signals are proportional to the orthogonal sides of a triangle, the quotient signals are respectively proportional to the sine and cosine of one of the acute angles of the triangle, and the sum signal is proportional to the hypotenuse of the triangle.

Figure 2:
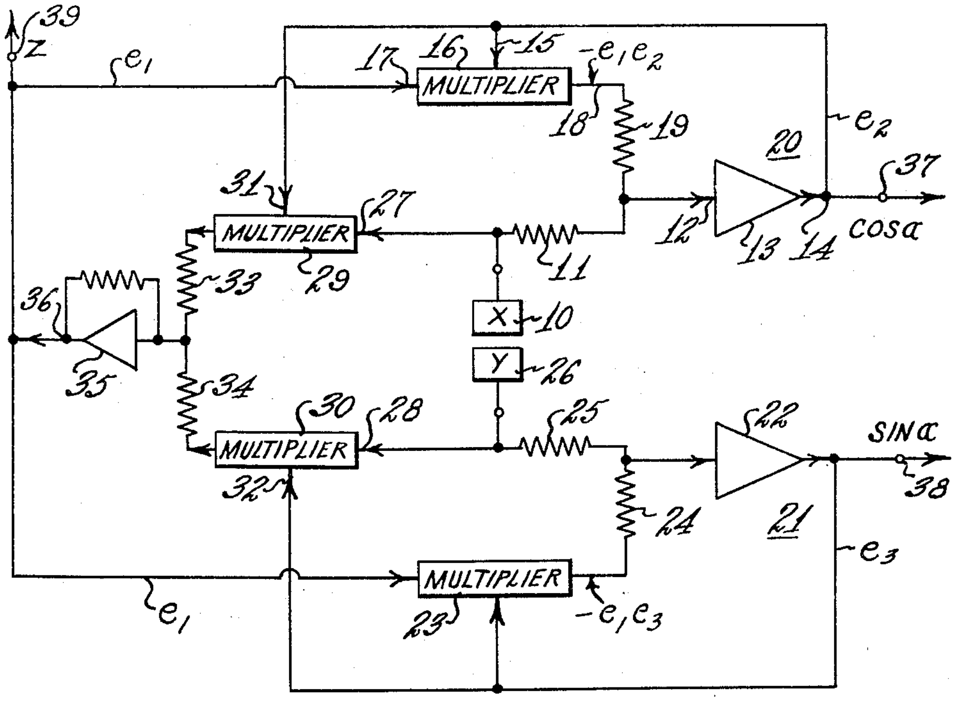

The foregoing and other objects, the advantages and novel features of this invention, as well as the invention itself, both as to its organization and mode of operation, may be best understood from the following description when read in connection with the accompanying drawing, in which like reference numerals refer to like parts, and in which:

Figure 1 is a geometrical diagram for explaining the mode of operation of the computing apparatus of this invention; and Figure 2 is a schematic block diagram of an embodiment of this invention.

In Figure 1 a right triangle is shown that has the orthogonal sides X and Y and the hypotenuse Z. Given the sides X and Y, which are variables, it is desired to find the sine and cosine of the acute angle $\alpha$ as well as the hypotenuse Z.

Shown in Figure 2 is a block diagram of an embodiment of the invention. Input signals proportional to the variable X are provided by a source 10. This invention is not restricted in its application to any particular type of input signals. For purposes of explanation, it is assumed that the input signals are voltages and the apparatus components are electrical. The source 10 is connected through a summing network shown as including a resistor 11 to the input 12 of a high-gain amplifier 13. The output 14 of the amplifier 13 is connected to one input 15 of a multiplier 16. The other multiplier input 17 receives a derived signal voltage $e_1$. The output 18 of the multiplier 16 is connected through a summing resistor 19 to the input 12 of the high-gain amplifier 13. The circuit loop 20 just described operates as a dividing circuit and is explained below. A second dividing circuit 21 includes a second high-gain amplifier 22, a second multiplier 23 and summing resistors 24, 25 connected in the same manner as the first dividing circuit 20. Input signals applied to the second dividing circuit 21 from a source 26 are proportional to the variable Y. The derived signal $e_1$ is also applied to the second multiplier 23. The X and Y signals are respectively applied to inputs 27 and 28 of third and fourth multipliers 29 and 30. The other input 31 of the third multiplier 29 receives the amplifier output from the first dividing circuit 20; and the other input 32 of the fourth multiplier 30 receives the amplifier output from the second dividing circuit 21. The product signals from the third and fourth multipliers 29 and 30 are summed in a network that includes summing resistors 33 and 34 and a summing amplifier 35. The signal at the output 36 of the summing amplifier 35 is fed back as the derived signal $e_1$ to the first and second multipliers 16 and 23.

The outputs of the first and second multipliers 16 and 23, which are assumed to be voltages, are arranged to be the negatives of the respective product signals produced. Inverter circuits (not shown) may be employed if required to produce the negative product signals. The feed back connections from the outputs of the amplifiers 13 and 22 to the inputs of the multipliers 16 and 23 are arranged to be in a sense to cause the inputs of the respective amplifiers 13 and 22 to approach zero.

If the amplifier output voltage in the first dividing circuit 20 is $e_2$, the output of the first multiplier 16 is $-e_1e_2$. The sum signal applied to the input of the amplifier is proportional to $X-e_1e_2$. Due to the feed back connection from the output of the high-gain amplifier 13 the amplifier input is reduced to substantially zero. Thus, $$X-e_1e_2=0$$

In a similar manner, the second dividing circuit 21 operates in accordance with the equation $$Y-e_1e_3=0$$

where $e_3$ is the output voltage of the amplifier 22.

The product signals from the third and fourth multipliers 29 and 30 are $Xe_2$ and $Ye_3$, respectively. These product signals are added by the summing resistors 33, 34 and the amplifier 35 to produce the signal voltage $e_1$. Thus, $$Xe_2+Ye_3=e_1$$

Substituting in Equation 3 relationships of $e_2$ and $e_3$ derived from the Equations 1 and 2, the following relationships are derived $$X^2+Y^2=e_1^2=Z^2$$

Substituting Z for $e_1$ in Equations 1 and 2 it is seen that the output of the amplifier 13 is cos $\alpha$, and the first dividing circuit 20 implicitly solves the equation $$X-Z\cos\alpha=0$$

The output of the amplifier 22 is sin $\alpha$, and the second dividing circuit 21 implicitly solves the equation $$Y-Z\sin\alpha=0$$

The third and fourth multipliers 29 and 30 and the amplifier 35 carry out the equation $X\cos\alpha+Y\sin\alpha=Z$. Thus, voltages proportional to cos $\alpha$, sin $\alpha$, and Z are respectively produced at terminals 37, 38, and 39 connected to the outputs of the amplifiers 13, 22 and 35.

Different types of multipliers may be employed. A preferred form of multiplier of high accuracy and high speed especially suitable in this arrangement is described in an article by E. A. Goldberg, "High-Accuracy Time-Division Multiplier," RCA Review, pages 265–274, September 1952. In this type of multiplier, a master unit generates a train of pulses that are time divided in accordance with one variable, and a slave unit varies the amplitude of the pulses in accordance with the other variable. The direct component of the resulting wavetrain is proportional to the product of the two variables. Employing such a time-division multiplier in the system of Figure 1, only two master units are needed for the cos $\alpha$ and sin $\alpha$ variables, respectively, together with four slave units. The slave units respectively correspond to the multipliers 16, 23, 29, and 30 and complete the multiplying operations required of those multipliers 16, 23, 29, and 30. Thus, for certain types of multipliers, the number of complete multipliers required in the system of Figure 1 is actually substantially less than the four shown there.

An appropriate form of amplifier that may be used is described in the article by E. A. Goldberg, "Stabilization of Wide-Band Direct-Current Amplifiers for Zero and Gain," RCA Review, pages 296–300, January 1950.

The equation solved by the system of Figure 2 is $$X^2+Y^2=Z^2$$

The system of this invention may be extended to a coordinate system in three dimensions with the space coordinates X, Y, and W to solve the equation $$X^2+Y^2+W^2=Z^2$$

This equation may be solved by the apparatus of Figure 2 with the addition of a third dividing circuit (not shown) of the type described to provide the quotient $$\frac{W}{Z}$$

and another multiplier (not shown) of the type described to provide the product of W and $$\frac{W}{Z}$$

This last product is then summed with the products from the multipliers 29 and 30 to provide the Z signal that is fed back to the dividing circuits in the manner described. The outputs of the dividing circuits are the direction cosines of a line from the origin of the coordinate system to the point in spaces whose coordinates are X, Y, and W. The system of Figure 2 may also be employed to solve equations of the form $$\frac{1}{a}X^2+\frac{1}{b}Y^2=Z^2$$

by different gain factors in the multipliers 29 and 30 to introduce the constants $$\frac{1}{a}\text{ and }\frac{1}{b}$$

respectively. The modifications of the system of Figure 2 to carry out such applications of this invention will be readily apparent to one skilled in the art.

Thus, by means of this invention, a new and improved system is provided for deriving mathematical functions. The apparatus of this invention may be employed for deriving trigonometric functions of an angle given the orthogonal sides of a triangle that contains the angle. The apparatus requires only the computational operations of multiplication and addition. Therefore, accurate high-speed components may be used.

What is claimed is:

1. Computer apparatus comprising first means for receiving first and second input signals and a derived signal and for deriving first and second quotient signals respectively proportional to the quotient of said first input signal and said derived signal and the quotient of said second input signal and said derived signal, second means for receiving said input signals and said quotient signals and for deriving a signal proportional to the sum of the product of said first quotient signal and said first input signal and the product of said second quotient signal and said second input signal, and means for applying said sum signal to said first means as said derived signal.

2. Computer apparatus comprising first means for receiving signals respectively proportional to the orthogonal sides X and Y of a right triangle and a derived signal proportional to the hypotenuse Z and for deriving signals proportional to cos $\alpha$ and sin $\alpha$ from said received signals in accordance with the relationships $X-Z\cos\alpha=0$ and $Y-Z\sin\alpha=0$; second means for receiving said signals proportional to X and Y and said cos $\alpha$ and sin $\alpha$ signals and for deriving signals proportional to Z in accordance with the relationship $X\cos\alpha+Y\sin\alpha=Z$; means for applying said derived sin $\alpha$ and cos $\alpha$ signals to said second means, and means for applying to said first means said derived signals proportional to Z.

3. Computer apparatus for deriving functions of first and second input signals comprising a plurality of multiplier circuits each having a plurality of inputs, a first summing circuit connected to receive the output of a first one of said multiplier circuits and said first input signal, first amplifying means connected between the output of said summing circuit and an input of said first multiplier circuit, a second summing circuit connected to receive the output of a second one of said multiplier circuits and said second input signal, second amplifying means connected between the output of said second summing circuit and an input of said second multiplier circuit, a third one of said multiplier circuits being connected to receive said first input signal and the output of said first amplifying means, a fourth one of said multiplier circuits being connected to receive said second input signal and the output of said second amplifying means, and a third summing circuit connected between the outputs of said third and fourth multiplier circuits and other ones of said inputs of said first and second multiplier circuits.

4. Computer apparatus comprising a plurality of divider circuits for receiving different input signals and a derived sum signal and for deriving signals proportional to quotients of said different input signals and said derived sum signal, a plurality of multiplier circuits each connected to receive a different one of said quotient signals and the corresponding one of said input signals and for deriving signals proportional to the product of the received one of said input signals and the received one of said quotient signals, and means connected to said multiplier circuits for deriving a signal proportional to the sum of said product signals and for applying said sum signal to said divider circuit as said derived sum signal.

5. Computer apparatus comprising a first and second divider circuit for respectively deriving signals proportional to the quotient of a first input signal and a derived signal and the quotient of a second input signal and said derived signal; first and second multiplier circuits respectively connected to receive, and to provide an output proportional to the product of, the quotient output of said first divider and said first input signal and the quotient output of said second divider and said second input signal; and means connected to said multiplier circuits for deriving a signal proportional to the sum of each said product output and for applying said sum signal to said first and said second divider circuit as said derived signal.

6. Computer apparatus as recited in claim 5 wherein each of said divider circuits includes a multiplier circuit, a summing circuit, and an amplifier, the output of said amplifier and said third signal being applied as inputs to said divider circuit multiplier.

References Cited in the file of this patent

Electronic Instruments (Greenwood et al.) 1948, pp. 131–135.

Electron Tube Circuits (Seely), 1950, pp. 164–165.

Robb et al.: "Some Electronic Analogue Computer Techniques," The University of Connecticut Engineering Experiment Station, Storrs, Connecticut, January 1953, No. 9, 16 pages.